United States Patent [19]

Delavaux

[11] Patent Number: 5,392,153
[45] Date of Patent: Feb. 21, 1995

[54] OPTICAL AMPLIFIER

[75] Inventor: Jean-Marc P. Delavaux, Wescosville, Pa.

[73] Assignee: AT&T Corp., Murray Hill, N.J.

[21] Appl. No.: 114,819

[22] Filed: Aug. 31, 1993

[51] Int. Cl.⁶ .............................................. H01S 3/06
[52] U.S. Cl. .................................................. 359/341
[58] Field of Search ............... 359/341, 115, 333, 160; 372/6

[56] References Cited

U.S. PATENT DOCUMENTS

| 5,253,104 | 10/1993 | Delavaux | 359/341 |
| 5,260,823 | 11/1993 | Payne et al. | 359/341 |
| 5,280,383 | 1/1994 | Federici et al. | 359/341 |
| 5,283,686 | 2/1994 | Huber | 359/341 |
| 5,287,216 | 2/1994 | Chirravuri et al. | 359/341 |

Primary Examiner—Mark Hellner
Attorney, Agent, or Firm—Richard D. Laumann

[57] ABSTRACT

An amplifier is described which has a two stage arrangement in which the second stage is pumped with the pump signal not used in the first stage.

15 Claims, 2 Drawing Sheets

OPTICAL AMPLIFIER

TECHNICAL FIELD

This invention relates generally to the field of optical amplifiers and particularly to the field of optical amplifiers using doped laser fiber amplifiers.

BACKGROUND OF THE INVENTION

The field of optical communications systems using optical fibers, although relatively new, is now well developed with many tens of thousands of optical fibers spanning millions of kilometers installed. An important consideration in the design of such systems is the distance the optical signal can travel through a fiber and still be reliably detected. The optical fibers attenuate the signals, and the first optical communication systems used repeaters to span long distances; signals are detected at the end of one fiber and then regenerated and launched into another fiber. The process is repeated as many times as necessary to span the desired distance. Repeaters, however, require complicated electronic systems to detect and regenerate the signals. A conceptually simpler system periodically amplifies the optical signal without necessarily regenerating it.

Although many types of optical amplifiers have been studied and considered for use in optical communications systems, the most widely used at the present time is the rare earth doped fiber amplifier with erbium being the most commonly used dopant. When optically pumped at suitable power and wavelength, the doped fiber amplifies an incoming signal such as one with a commonly used wavelength such as approximately 1.3 $\mu$m or 1.5 $\mu$m. Such amplifiers are now well known in the art and need not be described in detail.

The optical amplifier is, of course, subject to design constraints imposed by system considerations. For example, it should have both high gain and low noise for use in a practical system. It should also be easily implemented. Single stage amplifier configurations can not readily met these design constraints with respect to noise and gain. Backward and forward traveling amplified spontaneous emission (ASE) reduces the state of inversion of the fiber. This both decreases the gain and increases the noise figure. In a tandem amplifier, insertion of an isolator between the sections suppresses the backward traveling amplified spontaneous emission (ASE) and avoids degradation of the noise figure, but the gain is still limited. See, for example, Lumholt, *IEEE Photonics Technology Letters*, 4, pp. 568–570, June 1992. Additionally, in a single stage amplifier, a significant amount of pump power leaves the active fiber and is wasted.

Accordingly, two stage designs using multiple pump lasers have been implemented. Two stage amplifiers provide low noise and gain in the first fiber section; additional gain is provided the second fiber section. Two stage designs suffer from the drawbacks of added complexity and poor efficiency as compared to single stage designs. When both the pump and signal wavelengths are transmitted simultaneously through the isolator, for example, $\lambda$hd p=1480 nm and $\lambda$hd s=1550 nm, the isolator prevents degradation of amplifier performance by preventing transmission of the backward ASE between the amplifier sections, but it also attenuates both the pump and signal. When both the pump and signal wavelengths can not be simultaneously transmitted through the isolator, for example, $\lambda$hd p=980 nm and $\lambda$hd s=1550 nm, the pump power is then wasted.

An attempt to improve the two stage design with a single pump has been recently reported. See, for example, Laming et al., *IEEE Photonics Technology Letters*, 4, pp. 1348–1350 and 1345–1347, December 1992. These papers reported a single pump tandem preamplifier which used an interstage isolator between the second and third multiplexers to achieve both high gain and low noise performance. In this topology, the pump uses a by-pass route while the signal wavelength is transmitted through the isolator. Moreover, the amplifier described requires three multiplexers, increasing the complexity and optical insertion loss in the signal and pump wavelength paths.

SUMMARY OF THE INVENTION

According to an exemplary embodiment of this invention, an optical amplifier is fabricated with a pump laser and first and second multiplexers which are between first and second fiber amplifiers. The first and second amplifiers receive signals from the first and second multiplexers, respectively. The first fiber amplifier amplifies the input signal from the first multiplexer, and the second fiber amplifier receives the pump signal from the second multiplexer. The first multiplexer combines signals from the pump laser and the input. The second multiplexer demultiplexes the pump and amplified input signal and then multiplexes the amplified input signal with the recycled pump to be further amplified by the second fiber amplifier. The amplifier has means for taking the amplified input signal from the second multiplexer and providing an interstage isolator between the first and second amplifier stages.

In a preferred embodiment, the means for taking comprises an interstage isolator which may be an optical isolator, an optical fiber splice, loss element, or wavelength filter. In another preferred embodiment, the means for taking comprises a fiber loop which may have several configurations. For example, in one embodiment, the fiber loop is connected to tile second multiplexer and the signal from that multiplexer is looped through the second multiplexer, that is, it is again multiplexed with the pump. In another embodiment, the fiber loop is connected to the second multiplexer and the output signal is taken from the second multiplexer. In both of these embodiments, the interstage isolator is connected to the first loop. In yet another embodiment, the fiber loop may be the loss element.

BRIEF DESCRIPTION OF THE DRAWING

Identical numerals in different FIGURES represent identical elements.

DETAILED DESCRIPTION

The invention will be described by reference to a particular exemplary embodiment. After this embodiment is discussed in detail, results will be presented which compare the amplifier with prior art amplifiers. Another exemplary embodiment will then be discussed and other embodiments will be mentioned.

Figure 1:
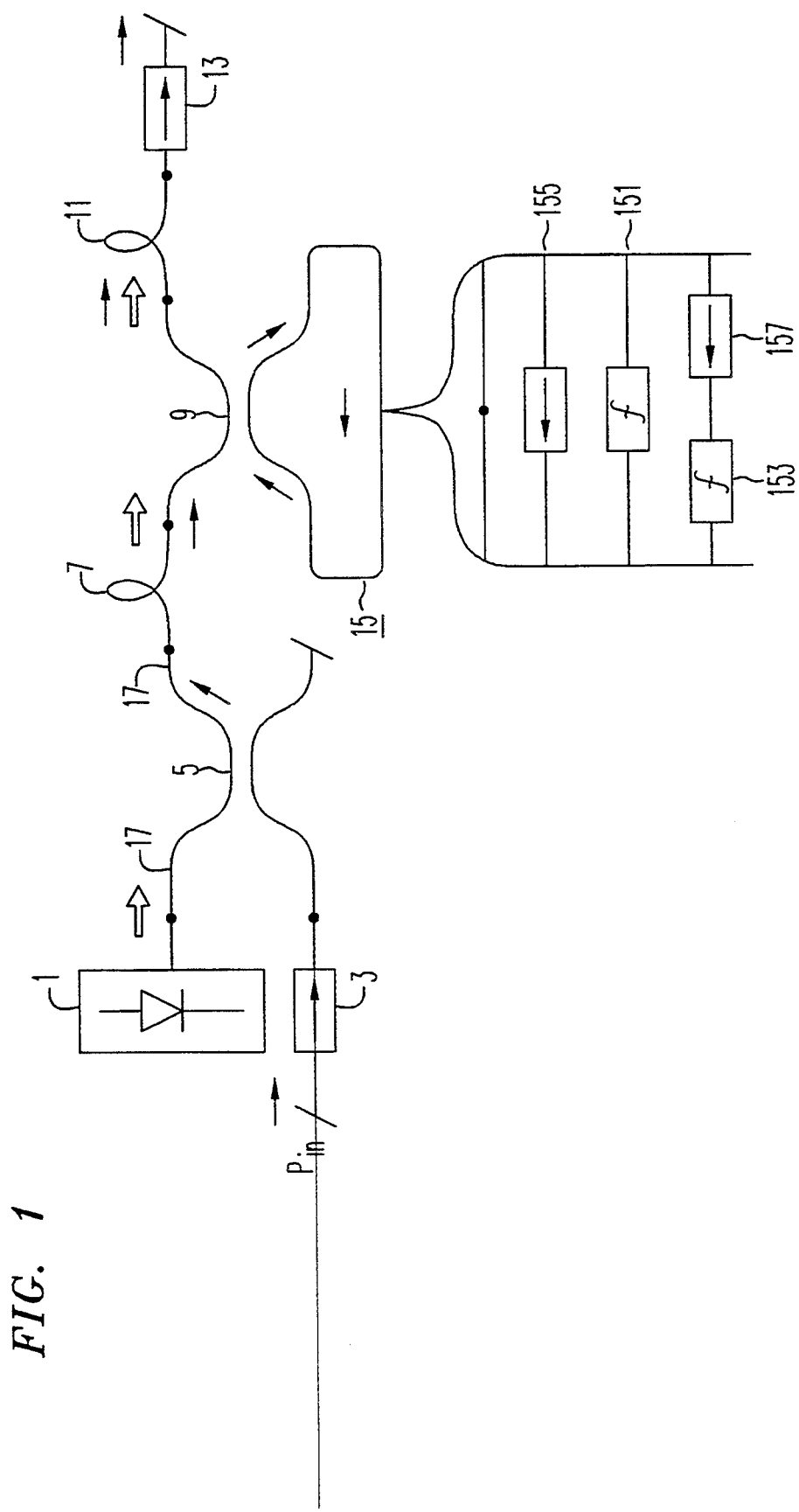
FIGS. 1 and 2 are schematic representations of exemplary embodiments of an amplifier according to this invention.

An exemplary embodiment is shown in FIG. 1. Depicted are pump laser 1, first isolator 3, first multiplexer 5, first fiber amplifier 7, second multiplexer 9, second fiber amplifier 11, and second isolator 13. The second multiplexer 9 is connected to a fiber loop 15. The fiber loop 15 further has an interstage isolator such first and second bandpass filters 151 and 153 and third and fourth isolators 155 and 157. There is an optical fiber splice which is also an interstage isolator. Although a plurality is depicted, only one of the interstage isolators will be used. The first filter 151 and third isolator 155 are parallel connected while the second filter and fourth isolator are series connected. The fiber loop 15 forms means for taking the signal from the second multiplexer and inserting it into the second multiplexer where it is again multiplexed with the pump, and then inserted into the second fiber amplifier. The input and output signals are coupled into and out of first and second isolators 3 and 13, respectively. The components mentioned are optically coupled together by means of optical waveguides indicated as 17. The embodiment depicted has two fiber amplifier stages separated by an interstage isolator that reduces traveling amplified spontaneous emission.

The embodiment depicted will be readily fabricated by those skilled in the art. A typical signal input is at 1550 nm and a typical pump laser, for the erbium doped fiber, is a semiconductor laser emitting 80 mW of radiation at 980 nm. Such lasers are well known in the art and will be readily selected. Other wavelengths can be used, but are not as efficient in exciting atoms into the population inverted state. The multiplexers will also be readily selected by those skilled in the art. For example, evanescent couplers may be used. The fiber amplifiers 7 and 11 are typically erbium doped fiber amplifiers which are now well known. Fiber lengths of 13 and 20 m were used for amplifiers 7 and 11, respectively. Appropriate lengths will be readily selected after consideration of such factors as gain and noise. As noted, the two amplifiers may have different lengths. The length is selected with consideration given to likely operating power as both gain and noise are functions of power. The fibers have a germano-silicate core and a numerical aperture (NA) of 0.24 and a cut-off wavelength of 890 nm. The amplifiers had an erbium absorption of 3.5 dB/m and 3.1 dB/m at 980 and 1530 nm, respectively.

The operation of the amplifier will be briefly described. The first fiber amplifier is pumped through the first multiplexer, that is by the pump signal from the first multiplexer. After this amplification, the second multiplexer demultiplexes the signal and the pump. The remainder of the pump signal is then used to pump the second fiber amplifier. The signal is looped back through the fiber loop and then into the second multiplexer, where it is again multiplexed and further amplified by the second fiber amplifier. An interstage isolator, such as an isolator in the fiber loop, further improves the amplifier gain and noise, by reducing both backward and forward ASE. A filter may also be used. For example, if the signal has a wavelength of 1555 nm, the ASE amplitude peaks near 1531 nm. A filter can pass most of the signal and stop most of the ASE. Some signal strength is lost, but this loss can be tolerated. The embodiment permits a wide selection of pump and signal frequencies as the multiplexing/demultiplexing functions are separated from the isolation element function; that is, the interstage isolator stops the remultiplexing of the backward ASE.

The gain and noise figures were measured as a function of pump power for three signal wavelengths; namely, 1533, 1548 and 1556 nm which correspond to different regions of the erbium fluorescent spectrum.

The results showed an improvement of 6 dB as compared to the gain for a single stage amplifier. A maximum gain of 44 dB was obtained for a signal input at 1563 nm. Still higher gains could be obtained for lower input signal levels. The noise figure was relatively flat with respect to wavelength; this characteristic conformed the efficiency of the isolator in blocking the backward ASE.

When gain and noise are examined as a function of signal output power, it is seen that the gain undergoes compression and then contraction thereby resulting in lower saturated output and higher noise figures. At the onset of saturation, more of the pump power is converted by the first stage into signal power, and less residual pump power is available for pumping the second stage. As the input signal power further increases, the pump power remaining is insufficient to achieve fiber transparency. The fiber then starts to absorb the signal power while the backward ASE further reduces the fiber inversion. As the amplifier is driven hard in saturation, the saturated output bottoms up and again increases linearly with the input signal. The fiber has regained transparency and no additional signal power is absorbed. This permits use as an amplifier-limiter.

The configuration was tested by using it as a preamplifier in a 10 Gb/sec transmission system. The transmitter used a 1556 nm distributed feedback laser which was externally modulated with a LiNbO$_3$ Mach-Zehnder modulator. The extinction ratio was better than 15 dB. The receiver filtered the amplifier output with an electrically tunable Fabry-Perot filter that had a 27.9 GHz bandwidth and a 3 dB insertion loss. The signal to noise ratio at the receiver input was 18 dB. In direct detection, the receiver sensitivity was $-19$ dBm at a BER of $10^{-9}$ using a high sensitivity front end PIN receiver.

The configuration described is used as a preamplifier, but could also be used as an inline amplifier or power booster in, for example, optical communications systems. The performance described was measured near 1556 nm, and the configuration should demonstrate still better performance at shorter wavelengths. In particular, performance should be good near the peak of the erbium emission spectrum near 1531 nm where many preamplifier experiments and results have been reported.

Figure 2:
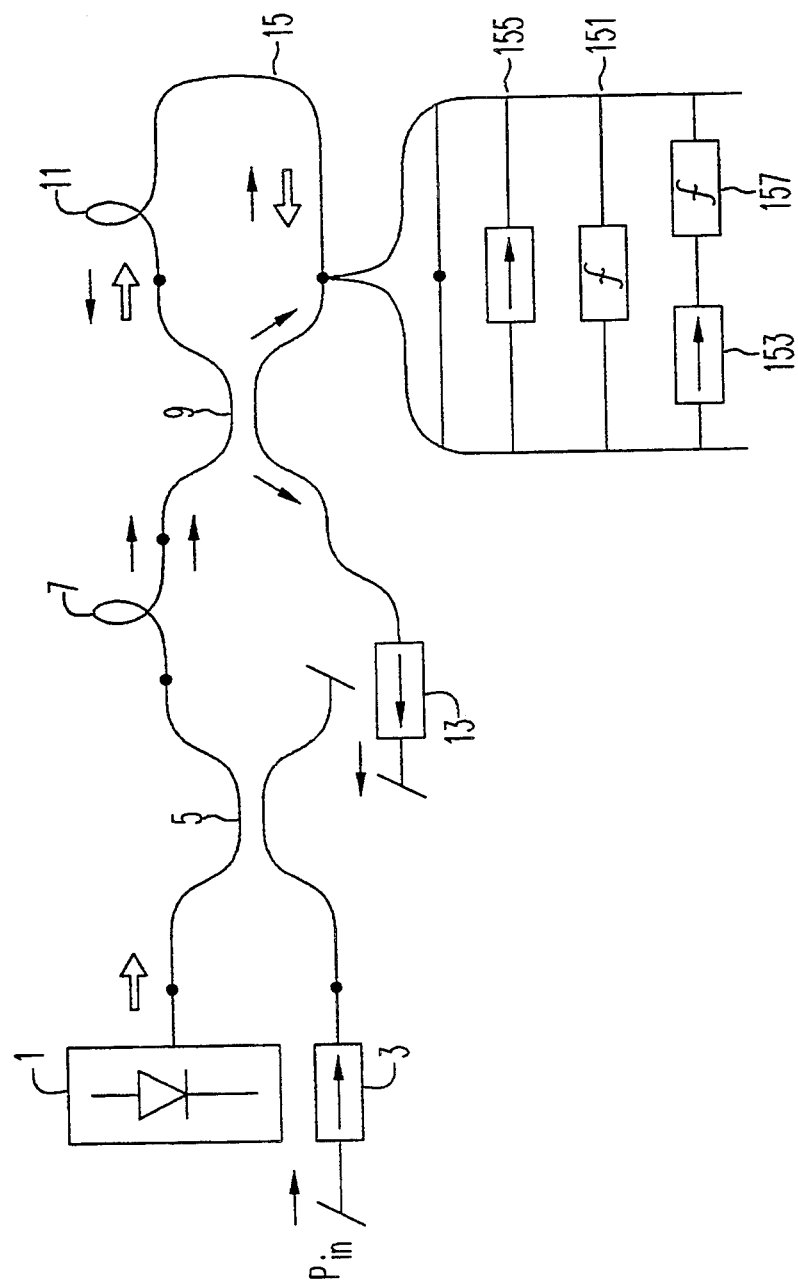

Another embodiment is depicted in FIG. 2. In this configuration, the fiber from the second fiber amplifier loops backs through the second multiplexer. The embodiment will be readily constructed by those skilled in the art. The operation is generally similar to the operation of the embodiment of FIG. I and need not be described.

Variations in the embodiments described will be readily thought of by those skilled in the an. For example, configurations other than those discussed are possible. In particular, in the embodiments depicted in FIGS. 1 and 2, the direction of the signal may be reversed, that is, the inputs and outputs may be reversed. That is, the signal may be inserted into and taken from isolators 13 and 3, respectively. If this is done, the lengths of the two fiber amplifiers are desirably reversed to provide best gain and noise performance. This embodiment is likely to produce more noise than the embodiments previously discussed with respect to FIGS. 1 and 2. The fiber loop may be a loss element which provides isolation between the amplifier stages that is, it is the interstage isolator. The fiber may be an undoped piece of erbium doped fiber. An appropriate length will be selected after consideration is given to wavelength equalization. Of course, the fiber is unpumped. This embodiment is reciprocal with respect to the input and output ports. The output power may be limited, but both noise and gain may be optimized. Additionally, the input signal may be generated by means of, for example, a fiber grating laser in the first section pumped by the pump. With such a configuration, both pump and signal wavelengths are produced simultaneously and may go directly to the first fiber amplifier. In this embodiment, the first multiplexer is eliminated. Fiber amplifiers using rare earths other than erbium may also be used in the invention. Rare earths other than erbium may also be used in the fiber used as a loss element.

The filter, such as filter 153, may be an add-drop filter. It may also be a multiplexer which can be used to multiplex another signal or another pump. Both another signal and another pump can be remultiplexed. The additional pump provides additional gain without degrading the noise figure.

I claim:

1. An optical amplifier comprising;
    a pump laser producing a pump signal;
    a first multiplexer, said first multiplexer being adapted to combine said pump signal and information signals;
    a first fiber amplifier for amplifying signals from said first multiplexer;
    a second multiplexer, said multiplexer for demultiplexing and multiplexing said pump signal and said information signals;
    a second fiber amplifier, said amplifier receiving said pump signal from said second multiplexer; and
    means for taking said input signal from said second multiplexer and inserting said signal into said second multiplexer, said means comprises an interstage isolator.

2. An optical amplifier as recited in claim 1 in which said interstage isolator comprises a filter means.

3. An optical amplifier as recited in claim 2 in which said isolation element comprises an optical isolator.

4. An optical amplifier as recited in claim 2 in which said interstage isolator comprises a wavelength filter.

5. An optical amplifier as recited in claim 4 in which said wavelength filter comprises an add-drop filter.

6. An optical amplifier as recited in claim 1 in which said means for taking comprises an optical fiber loop.

7. An optical amplifier as recited in claim 6 in which said optical fiber loop is connected to said second multiplexer so that the signal from said multiplexer is looped through said second multiplexer.

8. An optical amplifier as recited in claim 6 in which said fiber loop is connected to said second multiplexer and the output signal is taken from said second multiplexer.

9. An optical amplifier comprising;
    a fiber grating laser, said laser capable of transmitting a pump signal and an information signal;
    a first fiber amplifier connected to said fiber grating laser;
    a multiplexer, said multiplexer demultiplexing said pump signal and said information signals;
    a second fiber amplifier, said amplifier receiving said pump signal from said multiplexer; and
    means for taking said signal from said multiplexer and inserting said signal into said multiplexer, said means comprising as interstage isolator.

10. An optical amplifier as recited in claim 9 in which said means for taking comprises an optical fiber loop.

11. An optical amplifier as recited in claim 10 in which said fiber loop is connected to said second multiplexer so that the signal from said multiplexer is looped through said second multiplexer.

12. An optical amplifier as recited in claim 11 in which said fiber loop is connected to said second multiplexer and the output signal is taken from said second multiplexer.

13. An optical amplifier comprising;
    means for generating pump signal and information signal wavelengths;
    a first fiber amplifier for amplifying signals from said means;
    a multiplexer, said multiplexer for demultiplexing and multiplexing said pump signal and said information signals;
    a second fiber amplifier, said amplifier receiving said pump signal from said multiplexer; and
    a fiber loop connected to at least one of said second fiber amplifier and said multiplexer, said fiber loop being an interstage isolator.

14. An amplifier as recited in claim 13 in which said means for generating comprises;
    a pump laser;
    a multiplexer, said multiplexer being adapted to combine signals from said pump laser and input signals.

15. An amplifier as recited in claim 14 in which said fiber loop is wavelength equalized.

* * * * *